(12) United States Patent
Ehrmann et al.

(10) Patent No.: US 7,778,814 B2
(45) Date of Patent: Aug. 17, 2010

(54) METHOD AND DEVICE FOR SIMULATING AN AUTOMATION SYSTEM

(75) Inventors: Matthias Ehrmann, Neuendettelsau (DE); Holger Grzonka, Alpharetta, GA (US); Michael Schlereth, Wilhermsdorf (DE)

(73) Assignee: Siemens Aktiengesellschaft, München (DE)

( * ) Notice: Subject to any disclaimer, the term of this patent is extended or adjusted under 35 U.S.C. 154(b) by 634 days.

(21) Appl. No.: 11/568,786

(22) PCT Filed: Apr. 28, 2005

(86) PCT No.: PCT/EP2005/051946

§ 371 (c)(1),
(2), (4) Date: Aug. 2, 2007

(87) PCT Pub. No.: WO2005/111746

PCT Pub. Date: Nov. 24, 2005

(65) Prior Publication Data

US 2007/0288220 A1    Dec. 13, 2007

(30) Foreign Application Priority Data

May 7, 2004   (DE) .................. 10 2004 022 558

(51) Int. Cl.
*G06F 17/50* (2006.01)
*G06F 9/455* (2006.01)
*H03D 3/02* (2006.01)

(52) U.S. Cl. .................. 703/19; 703/13; 703/14; 716/6; 375/373; 375/376

(58) Field of Classification Search .......... 703/19, 703/13, 14; 716/6; 375/373, 376
See application file for complete search history.

(56) References Cited

U.S. PATENT DOCUMENTS 4,539,655 A * 9/1985 Trussell et al. .............. 710/100

(Continued)

FOREIGN PATENT DOCUMENTS

EP    0 415 637 A2    6/1991

(Continued)

OTHER PUBLICATIONS

Lane, D.M., et al: "Interoperability and synchronization of distributed hardware-in-the-loop simulation for underwater robot development: issues and experiments" IEEE International Conference on Robotics and Automation, Bd.1, 2001, 909-914, DOI 10.1109/Robot.2001.932666.

(Continued)

*Primary Examiner*—Kamini S. Shah
*Assistant Examiner*—Kibrom Gebresilassie
(74) *Attorney, Agent, or Firm*—Henry M. Feiereisen; Ursula B. Day

(57) ABSTRACT

A method and a device for simulating an automation system are disclosed. The aim of the invention is to allow an automation system to be simulated in such a way that simulation components operating at very different computing speeds can be combined into an overall simulation. Said aim is achieved by a method comprising a control component that can be clocked using an external timing source and at least one simulation component which can be clocked using an external timing source. A coordinated clock system is provided for the control component and the at least one simulation component by means of a control component-independent timing coordinator.

6 Claims, 2 Drawing Sheets

U.S. PATENT DOCUMENTS

| | | | | |
|---|---|---|---|---|
| 4,746,920 A | * | 5/1988 | Nellen et al. | 340/825.2 |
| 4,937,780 A | * | 6/1990 | Geyer et al. | 713/502 |
| 5,222,229 A | * | 6/1993 | Fukuda et al. | 713/375 |
| 5,373,254 A | * | 12/1994 | Nakauchi et al. | 331/1 A |
| 5,517,147 A | * | 5/1996 | Burroughs et al. | 327/295 |
| 5,701,439 A | | 12/1997 | James et al. | |
| 5,761,488 A | * | 6/1998 | Donath et al. | 703/13 |
| 5,784,421 A | * | 7/1998 | Dolev et al. | 375/354 |
| 5,875,320 A | * | 2/1999 | Gu | 713/375 |
| 6,535,926 B1 | * | 3/2003 | Esker | 709/248 |
| 6,654,356 B1 | * | 11/2003 | Eidson et al. | 370/303 |
| 6,832,326 B2 | * | 12/2004 | Kubo et al. | 713/400 |
| 7,103,855 B2 | * | 9/2006 | Saeki | 716/1 |
| 7,242,737 B2 | * | 7/2007 | Lake et al. | 375/372 |
| 7,317,773 B2 | * | 1/2008 | Young et al. | 375/354 |
| 7,340,630 B2 | * | 3/2008 | Morris et al. | 713/400 |
| 7,389,457 B2 | * | 6/2008 | Chen et al. | 714/727 |
| 7,512,826 B2 | * | 3/2009 | Armstrong et al. | 713/375 |
| 2002/0042844 A1 | * | 4/2002 | Chiazzese | 709/248 |
| 2004/0117682 A1 | * | 6/2004 | Xu | 713/400 |
| 2004/0153813 A1 | * | 8/2004 | Swoboda | 714/36 |
| 2006/0153325 A1 | * | 7/2006 | Uchida | 375/356 |
| 2008/0168255 A1 | * | 7/2008 | Abou-Emara et al. | 712/28 |

FOREIGN PATENT DOCUMENTS

| | | |
|---|---|---|
| JP | 2003256491 A | 9/2003 |
| WO | WO 2004/092928 A2 | 10/2004 |

OTHER PUBLICATIONS

Lane, D.M., et al: "Mixing simulations and real subsystems for subsea robot development. Specification and development of the core simulation engine" Conference Proceedings Oceans '98 Bd, 3, Sep. 28-1.Okt.1998, 1382-1386, DOI 10.1109/Oceans.1998.726295.

* cited by examiner

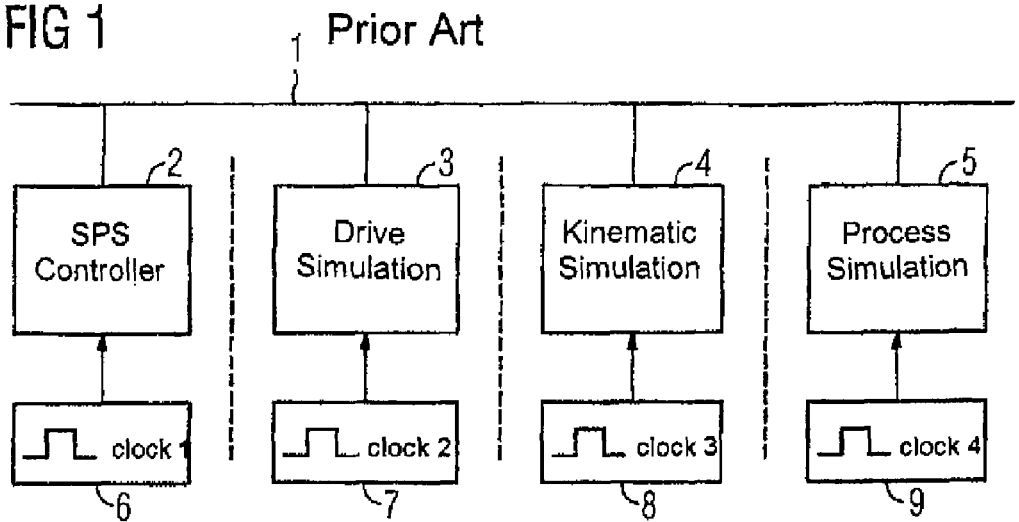
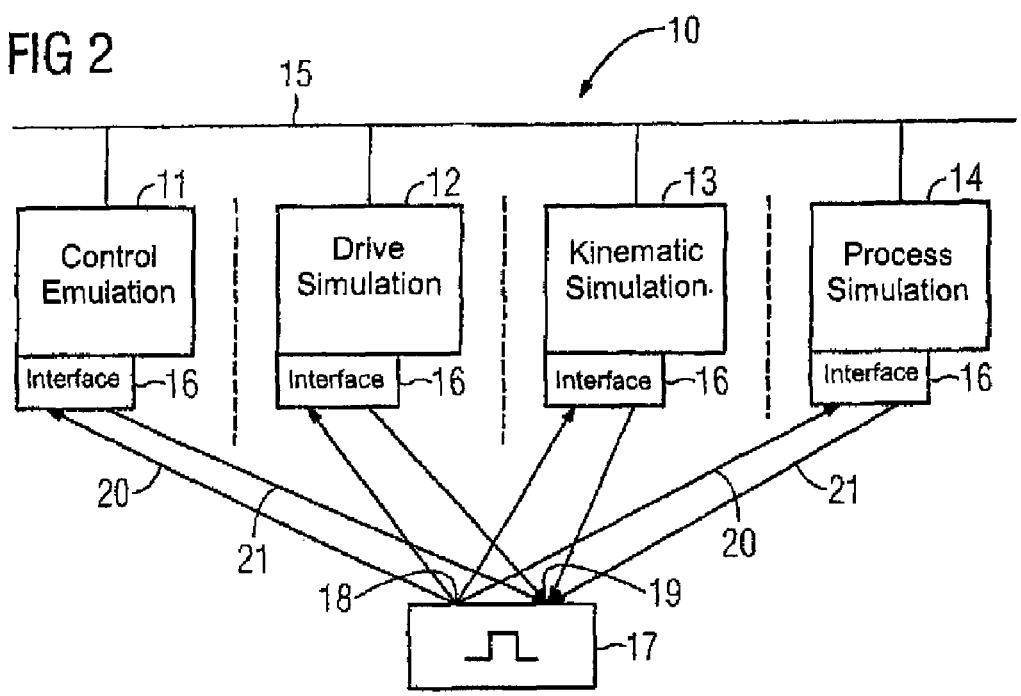

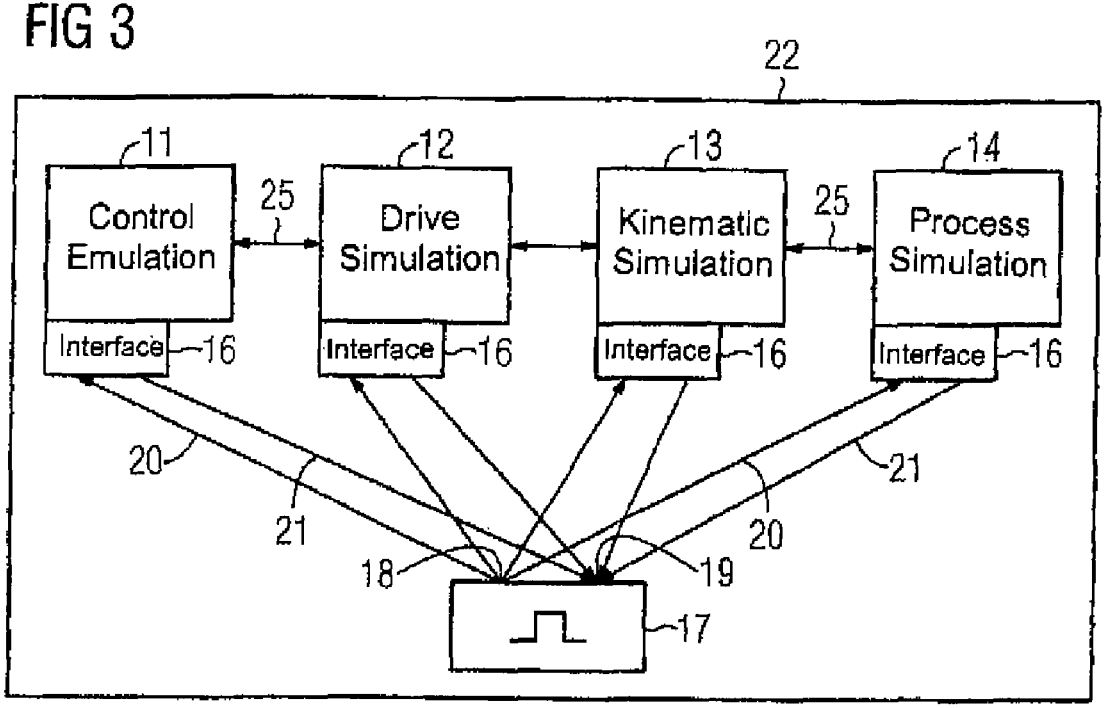
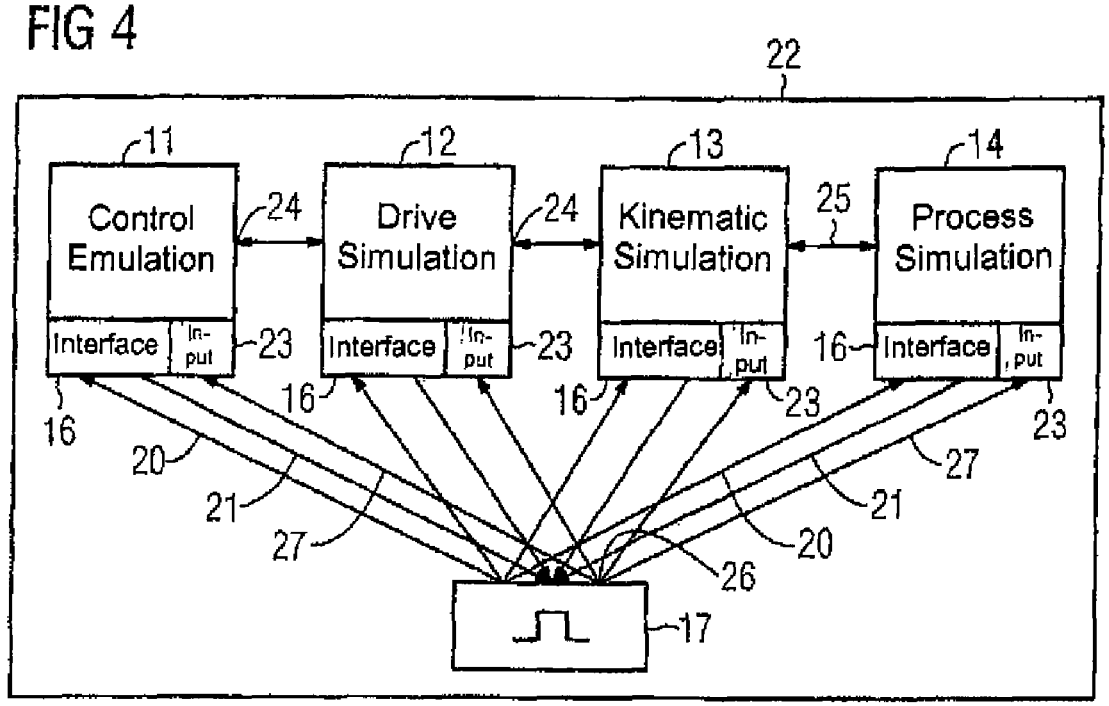

METHOD AND DEVICE FOR SIMULATING AN AUTOMATION SYSTEM

BACKGROUND OF THE INVENTION

The invention relates to a method and to a device for simulating an automation system.

In order to simulate automation systems, a control component is connected to one or more simulation components, for example a drive simulation or a kinematics simulation. The control component and the various simulation components that are, for example, processed on a computer system, run independently of one another in this process with the aid of a dedicated clock system in each case. The minimum clock frequency is always prescribed in this case by the control component, since the clock frequencies of the control component cannot be influenced.

Complex situations such as drive simulations or kinematics simulations are, however, frequently too slow, to be calculated in the clock time of the control component. Since, according to the prior art, the clock time of the simulation components is prescribed by the control component, the simulation components must therefore be accelerated in such a way that they operate in time with the control component. To this end, either the required hardware preconditions are drawn up such that the fastest possible computers are used to design the simulation components, or else use is made of special simulation hardware. Another possibility consists in reducing the degree of detail of the simulation so far that it can be executed quickly enough on the existing simulation hardware. The consequence of this is that specific simulations can be carried out either not at all or only with useless results, or else only with a disproportionately high outlay.

SUMMARY OF THE INVENTION

It is an object of the present invention to enable a simulation of an automation system to the effect that simulation components that operate at very different computing speeds can be connected so as to yield an overall simulation.

According to one aspect of the invention, the object is achieved by a method for simulating an automation system having a control component that can be clocked by means of an external clock source, and at least one simulation component that can be clocked by means of an external clock source, a coordinated clock system being provided for the control component and the at least one simulation component by means of a timing coordinator that is independent of the control component.

According to another aspect of the invention, the object is achieved by a device for simulating an automation system having a control component that can be clocked by means of an external clock source, having at least one simulation component that can be clocked by means of an external clock source, and having a timing coordinator, which is independent of the control component, for providing a coordinated clock system for the control component and the at least one simulation component.

According to yet another aspect of the invention, the object is achieved by a computer program for simulating an automation system having a control component that can be clocked by means of an external clock source, and at least one simulation component that can be clocked by means of an external clock source, and having computer program instructions for providing a coordinated clock system for the control component and the at least one simulation component by means of a timing coordinator that is independent of the control component, when the computer program is executed on a computer.

Consequently, the automation system has a control component and at least one simulation component, it being possible to clock both the control component and the at least one simulation component with the aid of an external clock source. According to the invention, a timing coordinator that is independent of the control component serves the purpose of providing a coordinated clock system for all the system components.

A core idea of the invention is to separate the prescription of the clock time from the control component and to provide a timing coordinator that is independent of the control component and establishes an external clock system. The invention is based, firstly, on the fact that the control component is designed in such a way that it can be clocked from outside, and secondly on the fact that an external timing coordinator uses this ability to synchronize the various system components via a common clock interface.

It is of no importance here whether the control component is designed as a real control hardware item or is, instead, replaced by a software emulation on a computer.

The invention can be used, for example, for real time simulation of automation controls and drives such as SIMOTION, SINAMICS, SINUMERIK or SIMATIC S7, all from SIEMENS AG.

In one embodiment of the invention, the timing coordinator operates in a fixed timing pattern. It is possible thereby, in particular, to reduce the speed of the control component and to adapt it to the speeds of the simulation components. If all the system components are operated at the same speed, even slow simulation components such as, for example, drive simulations or kinematics simulations, can be connected to the control component. In the case of such a fixed timing pattern, the clock is, in other words, set such that the clock cycle is large enough that even the slowest simulation component can execute all the simulation steps in this pattern. This embodiment of the invention is particularly easy to implement and to monitor.

In order to improve the comparatively low performance of this embodiment, it is provided in accordance with a further embodiment of the invention that the timing coordinator sets each clock pulse in a time-variable fashion. In this case, the timing coordinator does not trigger the next clock cycle in a fixed pattern, but as a function of the state of at least one of the system components. The triggering of the next clock cycle is preferably performed whenever all the simulation components have terminated the current clock pulse. As a result, the available computing power is optimally utilized in each clock cycle. A profound depth of detail can be achieved in the case of individual especially complex simulation steps.

Particularly advantageous is a two-phase timing coordination in the case of which not only is the system clock coordinated—so, too, is the data exchange between the system components. This resolves the problems of consistency known from the prior art and which can occur during the processing sequence or the data transfer between system components.

BRIEF DESCRIPTION OF THE DRAWING

The present invention is explained below in more detail with the aid of exemplary embodiments that are explained with the aid of the drawings, in which:

FIG. 1 shows a schematic of an automation system simulation with an asynchronous simulation clock according to the prior art, FIG. 2 shows a scheme of a coordinated simulation in a network, FIG. 3 shows a scheme of a coordinated simulation on an individual computer, and FIG. 4 shows a scheme of a coordinated simulation on an individual computer with a two-phase timing coordination.

DETAILED DESCRIPTION OF PREFERRED EMBODIMENTS

FIG. 1 shows a schematic of a simulation of an automation system according to the prior art in the case of which the individual system components are interconnected via a network 1. Serving here as control component 2 is a real control hardware in the form of a programmable controller (SPS). A drive simulation 3, a kinematics simulation 4 and a process simulation 5 are provided as simulation components. Each system component 2, 3, 4, 5 has an external clock generator 6, 7, 8, 9 such that the individual system components 2, 3, 4, 5 run independently of one another with a dedicated clock system in each case.

FIG. 2 shows a device 10 for simulating an automation system in accordance with the invention. This comprises as control component a software-based control emulation 11, running on a computer, of an SPS, as well as a number of software-based simulation components running on individual computers, specifically a drive simulation 12, a kinematics simulation 13 and a process simulation 14.

Instead of the software-based control emulation, it is also possible to use a controller hardware with a special firmware that supports the external synchronization. In this case, all the system components 11, 12, 13, 14 are interconnected via a network 15.

Each system component 11, 12, 13, 14 has an interface 16 via which the system clock of the respective component 11, 12, 13, 14 can be controlled via an external timing coordinator 17. The interface 16 is designed in the manner of a clock/acknowledge module. In other words, in addition to the clock function (clock), an acknowledge function is also provided in such a way that the external timing coordinator 17 receives an acknowledge relating to the termination of the clock cycle after each clock cycle of a system component 11, 12, 13, 14. The use of the acknowledge signal is superfluous if a fixed timing pattern is used instead of this time-variable system. The interface can then be designed without this functionality.

The external timing coordinator 17, which is implemented as software on a computer, comprises the functionality of a signal source 18 and a signal sink 19. The coordination of the system runs clock runs as follows in this case: the signal source 18 of the timing coordinator 17 sends a corresponding clock signal 20 to the clock interface 16 of the control emulation 11. After processing of the clock pulse, an acknowledgement 21 of the control emulation 11 passes from the acknowledge interface 16 to the signal sink 19 of the timing coordinator 17. Following thereupon, a clock signal 20 is transmitted from the signal source 18 of the timing coordinator 17 to the clock interface 16 of the drive simulation 12, and following the processing of the clock signal a corresponding acknowledgement 21 passes from the acknowledge interface 16 of the drive simulation 12 back to the signal sink 19 of the timing coordinator 17. The coordination is performed correspondingly in the case of the kinematics simulation 13 and the process simulation 14.

Such an automation simulation is particularly easy to operate when the system components 11, 12, 13, 14 are not distributed in a network 15 but run separately on a single simulation computer 22. Such an embodiment of the invention is illustrated in FIG. 3.

If the aim is to coordinate not only the clock pulse, but also the data exchange between the individual system components 11, 12, 13, 14, the clock/acknowledge interface 16 of each system component 11, 12, 13, 14 is supplemented by a load input 23, compare FIG. 4. The timing coordinator 17 then operates in a two-phase method. In this case, all the system components 11, 12, 13, 14 are clocked in a first phase. Here, a state vector provided for each system component 11, 12, 13, 14 changes whilst a respective output vector is kept constant (clock/acknowledge interface). In a second phase, the state vector of the individual system components 11, 12, 13, 14 is then kept constant while the output vector is updated in accordance with the transfer function of the state vector (load interface).

The coordination of the system clock is performed in this case in such a way that a consistent output value is always present at the communication outputs 24 of the individual system components 11, 12, 13, 14 within a clock pulse. In other words, it is ensured that the output value of a system component 11, 12, 13, 14 is not changed during the calculating time, since otherwise the remaining system components 11, 12, 13, 14 would process defective input values. For example, if the control emulation 11 of the drive simulation 12 transfers via a communication connection 25 the instruction to increase the operating current, this has the effect, for example, of effecting in the simulated drive a specific change in the speed of a drive motor that must, in turn, be acknowledged to the control emulation 11 by the drive simulation 12, the control emulation 11 determining from this acknowledgement a renewed current value for transmission to the drive simulation 12. If the various system components 11, 12, 13, 14 are operating with different clock pulses, it must be ensured that a consistent output value is always present at the communication outputs 24 of the individual system components 11, 12, 13, 14, for example at the output of the drive simulation 12, within a clock pulse. This is particularly important with regard to the fact that this output value is used not only by the control emulation 11, but also by the kinematics simulation 13. Proceeding from a system instant t(0), each system component 11, 12, 13, 14 initially attempts to calculate its own state for this instant t(0). However, to this end the system components 11, 12, 13, 14 require information from the other system components 11, 12, 13, 14 at the instant t(0). If, for example, the drive simulation 12 now firstly performs a calculation, it calculates its state at the instant t(1) on the basis of its state at the instant t(0). If the kinematics simulation 13 subsequently requires data from the drive simulation 12, it must be ensured that the kinematics simulation 13 has not already received the data for the instant t(1), since it is necessary to have calculated the step t(0) to t(1) in advance. In other words, it must be ensured that the data of the drive simulation 12 are still available from the instant t(0) for the kinematics simulation 13.

Otherwise expressed, a distinction is made for each system component 11, 12, 13, 14 and each instant t between an internal state vector and an external output vector. In this case, each of these vectors is designed as a type of data record that displays the instantaneous current value, the instantaneous performance or the instantaneous speed etc. The state vector is designed in this case in such a way that it is visible only within a system component 11, 12, 13, 14, while the output vector provides information for communication with other system components 11, 12, 13, 14.

If such a refinement with state vector and output vector were not provided, the simulation of the automation system would be dependent on the processing sequence within the individual system components 11, 12, 13, 14. However, it is thus possible for the respectively next state vector already to be calculated internally without changing the output vector in the process. The sequence of the internal processing therefore no longer plays a role. Since it is exclusively the output vectors that are relevant for the data exchange, the processing sequence can be optimized according to other points of view.

In order to execute this functionality, the timing coordinator has a further signal source 26 from which appropriate control signals 27 are sent to the load interfaces 23 of the system components 11, 12, 13, 14.

What is claimed is:

1. A method for simulating operation of an automation system having system components comprising a control component that can be clocked by means of an external clock source, and at least one simulation component that can be clocked by means of an external clock source, said method comprising the steps of:

providing a coordinated clock system for the system components by means of a timing coordinator that is independent of the control component;

providing with the timing coordinator a two-phase timing coordination, which also coordinates data exchange between individual system components;

clocking in a first phase all system components, causing a change in a state vector of each system component whilst maintaining an output vector of the corresponding system component at a constant value; and maintaining in a second phase the state vector of individual system components at a constant value whilst updating the output vector in accordance with a transfer function of the state vector.

2. The method of claim 1, wherein the timing coordinator operates in a fixed timing pattern.

3. The method according to claim 1, wherein said timing coordinator sets each clock pulse as a function of the state of at least one of the system components.

4. The method of claim 1, wherein the at least one simulation component is selected from the group consisting of drive simulation, kinematics simulation and process simulation.

5. A device for simulating operation of an automation system, said device comprising:

system components comprising a control component that is clocked by an external clock source and at least one simulation component that is clocked by an external clock source; and a timing coordinator, which is independent of the control component and provides a coordinated clock system for said system components, said timing coordinator configured to provide a two-phase timing coordination which also coordinates data exchange between individual system components, wherein in a first phase all system components are clocked and a state vector provided for each system component changes whilst a corresponding output vector is maintained at a constant value, and wherein in a second phase the state vector of the individual system components is maintained as a constant value whilst the output vector is updated in accordance with a transfer function of the state vector.

6. A computer program having computer program instructions stored on a computer readable medium, which when loaded into a computer memory, cause the computer to simulate an automation system having system components comprising a control component that can be clocked by means of an external clock source, and at least one simulation component that can be clocked by means of an external clock source, said computer program instructions further cause the computer to perform the method steps of: providing a coordinated clock system for the control component by means of a timing coordinator which is independent of the control component;

providing with the timing coordinator a two-phase tinning coordination, which also coordinates data exchange between individual system components;

clocking in a first phase all system components, causing a change in a state vector of each system component whilst maintaining an output vector of the corresponding system component at a constant value; and maintaining in a second phase the state vector of individual system components at a constant value whilst updating the output vector in accordance with a transfer function of the state vector.

* * * * *